United States Patent
Jeong et al.

(10) Patent No.: US 11,649,385 B2
(45) Date of Patent: May 16, 2023

(54) ADHESIVE FILM FOR POLARIZING PLATE, POLARIZING PLATE COMPRISING THE SAME, AND OPTICAL DISPLAY APPARATUS COMPRISING THE SAME

(71) Applicant: SAMSUNG SDI CO., LTD., Yongin-si (KR)

(72) Inventors: Woo Jin Jeong, Suwon-si (KR); Mi Yeon Yu, Suwon-si (KR); Han Joo Choi, Suwon-si (KR); Il Jin Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 311 days.

(21) Appl. No.: 16/840,808

(22) Filed: Apr. 6, 2020

(65) Prior Publication Data
US 2020/0317969 A1 Oct. 8, 2020

(30) Foreign Application Priority Data
Apr. 8, 2019 (KR) .......................... 10-2019-0040599

(51) Int. Cl.
*C09J 133/10* (2006.01)
*C08F 220/12* (2006.01)
(Continued)

(52) U.S. Cl.
CPC ........... *C09J 133/10* (2013.01); *C08F 220/12* (2013.01); *G02F 1/133528* (2013.01);
(Continued)

(58) Field of Classification Search
CPC .. C09J 133/08; C09J 133/10; C09J 2203/318; C08F 220/12; C08F 2203/318;
(Continued)

(56) References Cited

U.S. PATENT DOCUMENTS

2015/0205025 A1\* 7/2015 Park .................. G02B 1/10
359/483.01
2016/0238771 A1\* 8/2016 Lee .................. G02B 5/3033
(Continued)

FOREIGN PATENT DOCUMENTS

CN 102051131 A 5/2011
CN 102449092 A 5/2012
(Continued)

OTHER PUBLICATIONS

Chinese Office Action in corresponding Chinese Patent Application No. 202010268540.3, Chinese Office Action dated Sep. 17, 2021 (5 pgs.).
(Continued)

*Primary Examiner* — Sophie Hon
(74) *Attorney, Agent, or Firm* — Lewis Roca Rothgerber Christie LLP

(57) ABSTRACT

An adhesive film for polarizing plates, a polarizing plate including the same, and an optical display apparatus including the same are provided. An adhesive film for polarizing plates includes: a (meth)acrylic copolymer, a curing agent, a (meth)acrylic oligomer, and an antistatic agent, and has a modulus of about 0.5 MPa or more at about 25° C. and a surface resistance difference ΔSR of about 1.0 log (Ω/□) or less, as calculated by Equation 1 herein.

16 Claims, 1 Drawing Sheet

(51) Int. Cl.
*G02F 1/1335* (2006.01)
*C08K 5/19* (2006.01)

(52) U.S. Cl.
CPC ........... *C08K 5/19* (2013.01); *C09J 2203/318* (2013.01); *C09K 2323/057* (2020.08); *G02F 2202/28* (2013.01)

(58) Field of Classification Search
CPC ............. C08F 265/06; G02F 1/133528; G02F 2202/28; C08K 5/19; C09K 2323/057
See application file for complete search history.

(56) References Cited

U.S. PATENT DOCUMENTS

| | | | | |
|---|---|---|---|---|
| 2016/0370508 | A1* | 12/2016 | Jeong | G02B 5/3033 |
| 2017/0059756 | A1* | 3/2017 | Yoo | G02B 1/16 |
| 2017/0121565 | A1* | 5/2017 | Yasui | B32B 7/12 |
| 2019/0106608 | A1* | 4/2019 | Jozuka | C09J 11/08 |
| 2020/0033674 | A1* | 1/2020 | Fujita | G02F 1/133528 |

FOREIGN PATENT DOCUMENTS

| | | | | |
|---|---|---|---|---|
| CN | 106896438 | A | 6/2017 | |
| CN | 111018942 | A | 4/2020 | |
| CN | 111793440 | B * | 6/2022 | ............ C08F 220/12 |
| JP | 2010021048 | A * | 1/2010 | |
| JP | 2011016999 | A * | 1/2011 | ............ C09J 133/04 |
| JP | 2013-072951 | A | 4/2013 | |
| KR | 10-2010-0019802 | A | 2/2010 | |
| KR | 10-2018-0059521 | A | 6/2018 | |
| KR | 102376554 | B1 * | 3/2022 | ............ C09J 133/08 |
| TW | 201323570 | A1 | 6/2013 | |
| TW | 201617650 | A | 5/2016 | |
| TW | 201726419 | A * | 8/2017 | ............ B32B 27/30 |
| TW | 201728639 | A | 8/2017 | |
| TW | 201812349 | A | 4/2018 | |

OTHER PUBLICATIONS

Taiwan Office Action from corresponding Taiwan Patent Application No. 109111596, Taiwan Office action dated May 31, 2021 (4 pgs.).
Korean Office Action in corresponding Korean Patent Application No. 10-2019-0040599, Korean Office Action dated Oct. 16, 2021 (6 pgs.).
Taiwan Office Action dated Oct. 13, 2022, including Search Report, for Application No. 109111596, 7 pages.

* cited by examiner

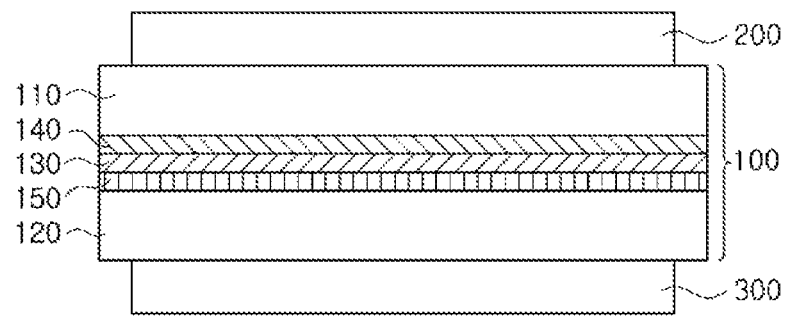

ADHESIVE FILM FOR POLARIZING PLATE, POLARIZING PLATE COMPRISING THE SAME, AND OPTICAL DISPLAY APPARATUS COMPRISING THE SAME

CROSS-REFERENCE TO RELATED APPLICATION

This application claims priority to and the benefit of Korean Patent Application No. 10-2019-0040599, filed on Apr. 8, 2019 in the Korean Intellectual Property Office, the entire disclosure of which is incorporated herein by reference.

BACKGROUND

1. Field

Aspects of embodiments of the present invention relate to an adhesive film for polarizing plates, a polarizing plate including the same, and an optical display apparatus including the same.

2. Description of the Related Art

A liquid crystal display may include polarizing plates bonded to both surfaces of a liquid crystal cell via adhesive films. In addition, a touch panel may be mounted on a display screen of the liquid crystal display. Among various kinds of touch panels including a capacitive touch panel, a resistive touch panel, an optical touch panel, an ultrasound touch panel, and an electromagnetic touch panel, the capacitive touch panel is generally used in the art. In recent years, a liquid crystal display including a capacitive sensor as a touch sensor unit to provide a touch sensing function has been used in the art.

In manufacture of the liquid crystal display, static electricity is generated when a release film is separated from an adhesive film attached to a polarizing plate in order to bond the adhesive film-attached polarizing plate to a liquid crystal cell. The static electricity may affect alignment of liquid crystals in the liquid crystal display, and thereby cause failure of the liquid crystal display. Generation of static electricity can be suppressed by, for example, forming an antistatic layer on an outer surface of the polarizing plate.

On the other hand, a capacitance sensor of a liquid crystal display having a touch sensing function detects a weak capacitance formed by a transparent electrode pattern and a user's finger when the finger approaches the surface thereof. When a conductive layer, such as an antistatic layer, is disposed between the transparent electrode pattern and the user's finger, an electric field generated between a drive electrode and a sensor electrode is disturbed to destabilize capacity of the sensor electrode, thereby deteriorating touch panel sensitivity and causing malfunction of the liquid crystal display. The liquid crystal display having a touch sensing function is required to suppress generation of static electricity and malfunction of the capacitance sensor. In particular, when the adhesive film is left under high temperature/humidity conditions, it is generally difficult for the adhesive film to exhibit surface resistance as at normal temperature. In order to solve this problem, it has been suggested to use a hydrophilic monomer such as a hydroxyl group-containing monomer in a (meth) acrylic copolymer in the adhesive film or to increase the content of an antistatic agent. However, it is difficult to ensure surface resistance of the adhesive film under high temperature and high humidity conditions through increase in content of the antistatic agent and introduction of the hydroxyl group-containing monomer.

The background technique of the present invention is disclosed in JP Unexamined Patent Publication No. 2013-072951 and the like.

SUMMARY

According to an aspect of embodiments of the present invention, an adhesive film for polarizing plates that has good reliability of surface resistance and good peel strength and secures target surface resistance under high temperature and high humidity conditions is provided.

According to another aspect of embodiments of the present invention, an adhesive film for polarizing plates that can realize a touch sensing function and can suppress display failure and/or malfunction even after being left under high temperature and high humidity conditions for a long period of time is provided.

According to another aspect of embodiments of the present invention, an adhesive film for polarizing plates that can minimize or reduce a time for which a whitening phenomenon of liquid crystals disappears upon electric shock is provided.

According to another aspect of embodiments of the present invention, an adhesive film for polarizing plates that can be applied to an in-cell type liquid crystal panel is provided.

According to another aspect of embodiments of the present invention, an adhesive film for polarizing plates that has good warpage suppression effect is provided.

According to one or more embodiments of the present invention, an adhesive film for polarizing plates includes: a (meth)acrylic copolymer, a curing agent, a (meth)acrylic oligomer, and an antistatic agent, and has a modulus of about 0.5 MPa or more at about 25° C. and a surface resistance difference ΔSR of about 1.0 log (Ω/□) or less, as calculated by the following Equation 1:

$$\Delta SR = SR2 - SR1,$$

where SR1 is a log value (unit: log (Ω/□)) of an initial surface resistance of the adhesive film, and SR2 is a log value (unit: log (Ω/□)) of a surface resistance of the adhesive film left under conditions of about 85° C. and about 85% RH (relative humidity) for about 250 hours.

In one or more embodiments, each of the initial surface resistance of the adhesive film and the surface resistance of the adhesive film left under conditions of about 85° C. and about 85% RH for about 250 hours, in Equation 1, is from $1 \times 10^8 \Omega/\square$ to $1 \times 10^{11} \Omega/\square$.

In one or more embodiments, the adhesive film may have a modulus of about 0.05 MPa or less at about 85° C.

In one or more embodiments, the adhesive film may have a peel strength of about 100 gf/25 mm or more.

In one or more embodiments, the adhesive film may have a peel strength of about 100 gf/25 mm or more, as measured after the adhesive film is left under conditions of about 85° C. and about 85% RH for about 250 hours.

In one or more embodiments, the adhesive film for polarizing plates may have a modulus difference (ΔG) of about 0.06 MPa or more, as calculated by the following Equation 2:

$$\Delta G = G1 - G2,$$

where G1 is a modulus at about 25° C. (unit: MPa) of the adhesive film, and G2 is a modulus at about 85° C. (unit: MPa) of the adhesive film.

In one or more embodiments, the antistatic agent may be present in an amount of about 0.1 parts by weight to 10 parts by weight relative to about 100 parts by weight of the (meth)acrylic copolymer.

In one or more embodiments, the antistatic agent may include a cationic antistatic agent, an anionic antistatic agent, an amphoteric antistatic agent, a non-ionic antistatic agent, or an ion conductive polymer obtained through polymerization or copolymerization of a monomer having an ion conductive group of the cationic antistatic agent, the anionic antistatic agent, or the amphoteric antistatic agent.

In one or more embodiments, the antistatic agent may include at least one selected from the group of a surfactant, an ionic liquid, an alkali metal salt, a metal oxide, fine metal particles, a conductive polymer, carbon, and carbon nanotubes.

In one or more embodiments, the antistatic agent may include an ionic liquid.

In one or more embodiments, the (meth)acrylic oligomer may have a glass transition temperature of about 20° C. to about 60° C.

In one or more embodiments, the (meth)acrylic oligomer may have a weight average molecular weight of about 1,000 g/mol to about 30,000 g/mol.

In one or more embodiments, the (meth)acrylic oligomer may include at least one oligomer selected from the group of t-butyl methacrylate, methyl acrylate, and hydroxyethyl methacrylate.

In one or more embodiments, the curing agent may include a polyisocyanate curing agent comprising a plurality of units containing a urethane bond and an alkylene group having a carbon number of 2 or more.

In one or more embodiments, the curing agent may include a plurality of units represented by the following Formula 1:

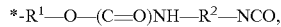

*-$R^1$—O—(C=O)NH—$R^2$—NCO, where * is a linking site, and $R^1$ and $R^2$ are identical to or different from each other and are a bivalent $C_2$ to $C_{20}$ aliphatic hydrocarbon group.

In one or more embodiments, the (meth)acrylic copolymer may include a copolymer of a monomer mixture including a $C_1$ to $C_{20}$ alkyl group-containing (meth)acrylic monomer and a hydroxyl group-containing (meth)acrylic monomer.

In one or more embodiments, the monomer mixture may further include an aromatic group-containing (meth)acrylic monomer.

In one or more embodiments, the adhesive film may include about 100 parts by weight of the (meth)acrylic copolymer, greater than 0 to 5 parts by weight or less of the curing agent, about 1 part by weight to 30 parts by weight of the (meth)acrylic oligomer, and about 0.1 parts by weight to 10 parts by weight of the antistatic agent.

According to one or more embodiments of the present invention, a polarizing plate includes the adhesive film for polarizing plates according to any of the above-described embodiments.

According to one or more embodiments of the present invention, an optical display apparatus includes the above-described polarizing plate.

According to an aspect of embodiments of the present invention, an adhesive film for polarizing plates has good reliability of surface resistance and good peel strength and secures target surface resistance under high temperature and high humidity conditions.

According to another aspect of embodiments of the present invention, an adhesive film for polarizing plates can realize a touch sensing function and can suppress display failure and/or malfunction even after being left under high temperature and high humidity conditions for a long period of time.

According to another aspect of embodiments of the present invention, an adhesive film for polarizing plates can minimize or reduce a time for which a whitening phenomenon of liquid crystals disappears upon electric shock.

According to another aspect of embodiments of the present invention, an adhesive film for polarizing plates can be applied to an in-cell type liquid crystal panel.

According to another aspect of embodiments of the present invention, an adhesive film for polarizing plates has good warpage suppression effect.

BRIEF DESCRIPTION OF THE DRAWING

The drawing is a cross-sectional view of an optical display apparatus according to an embodiment of the present invention.

DETAILED DESCRIPTION

Herein, some example embodiments of the present invention will be described in further detail with reference to the accompanying drawings. However, it is to be understood that the present invention is not limited to the following embodiments and may be embodied in different ways. The following embodiments are provided to provide thorough understanding of the invention to those skilled in the art.

Herein, "peel strength" means 180° peel strength between an adhesive film for polarizing plates and a glass plate, as measured at 25° C. in accordance with JIS2107.

Herein, "modulus" refers to storage modulus, as measured on a 0.8 mm thick specimen at about 25° C. or at about 85° C. using an ARES (Advanced Rheometric Expansion System, TA instruments Inc.) by temperature sweep testing (strain 5%, normal force 100 N) at 1 Hz while increasing the temperature from about 0° C. to 120° C. at a heating rate of about 10° C./min, which the specimen is prepared by stacking a plurality of adhesive films each having a thickness of about 23 μm one above another.

Herein, "surface resistance" is measured using a specimen prepared by pressing a release film (PET film) on an upper surface of an adhesive film for polarizing plates in a stack of the release film (PET film) and the adhesive film for polarizing plates using a roller. The prepared specimen is cut into a square shape having a size of about 50 mm×50 mm. Then, surface resistance is measured on a surface of the adhesive film for polarizing plates exposed by removing the release film (PET film) using a surface resistance tester (HT-450, Mitsubishi Chemical Co., Ltd.) at about 10 V for about 10 seconds.

Herein, the term "(meth)acryl" refers to acryl and/or methacryl.

Herein, "weight average molecular weight" is a value obtained by gel permeation chromatography in accordance with polystyrene standards.

As used herein to represent a specific numerical range, the expression "X to Y" means greater than or equal to X and less than or equal to Y (X≤ and ≤Y).

Unless otherwise defined, all terms (including technical and scientific terms) used herein have the same meaning as commonly understood by one of ordinary skill in the art to which example embodiments of the inventive concept belong. It is to be further understood that terms, such as those defined in commonly-used dictionaries, should be interpreted as having a meaning that is consistent with their meaning in the context of the relevant art and will not be interpreted in an idealized or overly formal sense unless expressly so defined herein.

According to an aspect of embodiments of the present invention, an adhesive film for polarizing plates includes a (meth)acrylic copolymer, a curing agent, a (meth)acrylic oligomer, and an antistatic agent, and has a modulus of 0.5 MPa or more at 25° C.

According to an aspect, an adhesive film for polarizing plates according to embodiments of the present invention can secure a target surface resistance range at room temperature and reliability of surface resistance under high temperature and high humidity conditions by suppressing variation in surface resistance even upon exposure to high temperature and high humidity conditions for a long period of time, and has a surface resistance of about $1 \times 10^8 \Omega/\square$ to $1 \times 10^{11} \Omega/\square$ even after the adhesive film is left under high temperature and high humidity conditions for a long period of time, thereby effectively realizing a touch sensing function and suppressing display failure and/or malfunction to minimize or reduce a time for which a whitening phenomenon of liquid crystals disappears upon electric shock. The "whitening phenomenon of liquid crystals disappears upon electric shock" can be checked by an evaluation method using an electrostatic discharge gun described below.

Herein, an adhesive film for polarizing plates (herein simply referred to as "adhesive film") according to an embodiment of the invention will be described.

In an embodiment, the adhesive film includes a (meth)acrylic copolymer, a curing agent, a (meth)acrylic oligomer, and an antistatic agent described below. In addition, the adhesive film has a modulus of 0.5 MPa or more at 25° C. through control of the amounts of the (meth)acrylic copolymer, the curing agent and/or the (meth)acrylic oligomer. Within this range, even when the adhesive film is left under high temperature and high humidity conditions for a long period of time, elution of the antistatic agent from the adhesive film can be retarded, thereby securing reliability of surface resistance of the adhesive film under high temperature and high humidity conditions. By setting the modulus at about 25° C. to about 0.5 MPa or more, the curing density of the adhesive film can be increased, whereby an elution rate of the antistatic agent from the adhesive film to a surface of the adhesive film can be reduced even when the adhesive film is left under high temperature and high humidity conditions for a long period of time, thereby securing reliability of surface resistance of the adhesive film.

In one embodiment, the adhesive film may have a surface resistance difference $\Delta SR$ of about 1.0 log ($\Omega/\square$) or less (for example, 0.1, 0.2, 0.3, 0.4, 0.5, 0.6, 0.7, 0.8, 0.9 or 1.0 log ($\Omega/\square$)), as calculated by Equation 1. Within this range, the adhesive film has high reliability under high temperature and high humidity conditions and exhibits no difference in touch sensing function between before and after being left under high temperature and high humidity conditions.

$$\Delta SR = SR2 - SR1, \quad \text{Equation 1:}$$

where SR1 is a log value (unit: log ($\Omega/\square$)) of an initial surface resistance of the adhesive film, and SR2 is a log value (unit: log ($\Omega/\square$)) of a surface resistance of the adhesive film left under conditions of about 85° C. and about 85% RH for about 250 hours.

Here, "initial surface resistance" means surface resistance of the adhesive film prior to having been left under conditions of about 85° C. and about 85% RH for about 250 hours.

In an embodiment, the adhesive film may have a surface resistance difference $\Delta SR$ of about 0 to 1.0 log ($\Omega/\square$), and, in an embodiment, 0.15 log ($\Omega/\square$) to 1.0 log ($\Omega/\square$), and, in an embodiment, 0.15 log ($\Omega/\square$) to 0.6 log ($\Omega/\square$).

In an embodiment, the adhesive film may have a modulus of about 0.5 MPa or more at about 25° C., and, in an embodiment, 0.5 MPa to 1.0 MPa (for example, 0.5, 0.6, 0.7, 0.8, 0.9, or 1.0 MPa), and, in an embodiment, about 0.5 MPa to 0.8 MPa, and, in an embodiment, about 0.5 MPa to 0.7 MPa. Within this range, the adhesive film has good reliability of surface resistance under high temperature and high humidity conditions, good peel strength at room temperature, can easily reach the surface resistance of Equation 1, and can have a warpage suppression effect.

In an embodiment, the adhesive film may have a surface resistance of $1 \times 10^8 \Omega/\square$ to $1 \times 10^{11} \Omega/\square$ (for example, $1 \times 10^8$, $1 \times 10^9$, $1 \times 10^{10}$, or $1 \times 10^{11} \Omega/\square$)), as measured after being left under conditions of about 85° C. and about 85% RH for about 250 hours. Within this range, the adhesive film can effectively realize a touch sensing function and can suppress display failure and/or malfunction to minimize or reduce a time for which a whitening phenomenon of liquid crystals disappears upon electric shock.

The adhesive film may have any initial surface resistance, that is, the initial surface resistance in Equation 1, within the range of about $1 \times 10^8 \Omega/\square$ to $1 \times 10^{11} \Omega/\square$. In one embodiment, the adhesive film may have an initial surface resistance of about $1 \times 10^8 \Omega/\square$ to $1 \times 10^{11} \Omega/\square$. Within this range, the adhesive film can effectively realize a touch sensing function and can suppress display failure and/or malfunction to minimize or reduce a time for which a whitening phenomenon of liquid crystals disappears upon electric shock.

Despite the inclusion of the antistatic agent and desirable modulus, the adhesive film may have an initial peel strength of about 100 gf/25 mm or more and a peel strength of about 100 gf/25 mm or more even after the adhesive film is left under conditions of about 85° C. and 85% RH for a long period of time. Generally, the aforementioned surface resistance of the adhesive film requires use of an excess of the antistatic agent, thereby causing deterioration in peel strength due to elution of the antistatic agent to the surface of the adhesive film. Moreover, such deterioration in peel strength of the adhesive film can be further accelerated in a case in which the adhesive film is left under high temperature and high humidity conditions for a long period of time. Moreover, although increase in modulus can be achieved through use of an excess of the curing agent, there can be a problem of deterioration in peel strength. However, the adhesive film according to one or more embodiments of the present invention includes the (meth)acrylic copolymer, the curing agent, the (meth)acrylic oligomer, and the antistatic agent, and has high peel strength by securing a target modulus at about 25° C.

In an embodiment, the adhesive film may have an initial peel strength of about 100 gf/25 mm or more, and, in an embodiment, about 100 gf/25 mm to 300 gf/25 mm (for example, 100, 110, 120, 130, 140, 150, 160, 170, 180, 190, 200, 210, 220, 230, 240, 250, 260, 270, 280, 290, or 300 gf/25 mm), and, in an embodiment, about 100 gf/25 mm to 200 gf/25 mm.

In an embodiment, the adhesive film may have a peel strength of about 100 gf/25 mm or more, and, in an embodiment, about 500 gf/25 mm or more, and, in an embodiment, 500 gf/25 mm to 800 gf/25 mm (for example, 500, 600, 700, or 800 gf/25 mm), as measured after being left under conditions of about 85° C. and about 85% RH for a long period of time, for example, about 250 hours.

In an embodiment, the adhesive film may have a modulus of about 0.05 MPa or less at about 85° C., and, in an embodiment, greater than about 0 MPa to 0.05 MPa (for example, 0.01, 0.02, 0.03, 0.04, or 0.05 MPa), and, in an embodiment, about 0.01 MPa to 0.05 MPa, and, in an embodiment, about 0.03 MPa to 0.05 MPa, and, in an embodiment, about 0.04 MPa to 0.05 MPa. Within this range, the adhesive film can suppress warpage at high temperature and can improve reliability.

In an embodiment, the adhesive film may have a modulus difference (ΔG) of about 0.06 MPa or more, as calculated by Equation 2. Within this range, the adhesive film can suppress defect upon compression and warpage at high temperature. For example, the adhesive film may have a modulus difference (ΔG) of about 0.06 MPa to 1.0 MPa (for example, 0.06, 0.08, 0.1, 0.12, 0.14, 0.16, 0.18, 0.2, 0.22, 0.24, 0.26, 0.28, 0.3, 0.32, 0.34, 0.36, 0.38, 0.4, 0.42, 0.44, 0.46, 0.48, 0.5, 0.52, 0.54, 0.56, 0.58, 0.6, 0.62, 0.64, 0.66, 0.68, 0.7, 0.72, 0.74, 0.76, 0.78, 0.8, 0.82, 0.84, 0.86, 0.88, 0.9, 0.92, 0.94, 0.96, 0.98, or 1.0 MPa), and, in an embodiment, 0.1 MPa to 1.0 MPa.

$$\Delta G = G1 - G2, \text{Equation 2:}$$

where G1 is a modulus at about 25° C. (unit: MPa) of the adhesive film, and G2 is a modulus at about 85° C. (unit: MPa) of the adhesive film.

In an embodiment, the adhesive film may have a visible light transmittance of about 80% or more, for example, about 90% to 100%. In an embodiment, the adhesive film may have a thickness of about 10 μm to 150 μm, for example, about 10 μm to 100 μm. Within this range, the adhesive film can be used in an optical display apparatus.

Herein, the (meth)acrylic copolymer, the curing agent, the (meth)acrylic oligomer, and the antistatic agent for the adhesive film will be described in further detail.

The adhesive film includes the (meth)acrylic copolymer, the curing agent, the (meth)acrylic oligomer, and the antistatic agent.

In an embodiment, the curing agent may include a polyisocyanate curing agent (herein, first curing agent) containing at least two long-chain alkylene groups. With the (meth) acrylic copolymer including both the polyisocyanate curing agent containing at least two long-chain alkylene groups and the (meth)acrylic oligomer described below, the adhesive film can achieve the surface resistance difference of Equation 1, peel strength, and modulus according to embodiments of the present invention.

Although the following description focuses on the polyisocyanate curing agent containing at least two long-chain alkylene groups as the curing agent, it is to be understood that the present invention is not limited thereto. So long as the adhesive film can secure moduli at about 25° C. and at about 85° C. according to embodiments of the present invention, the curing agent is not limited to a particular kind of curing agent. In an embodiment, the curing agent includes the polyisocyanate curing agent containing at least two long-chain alkylene groups.

The (meth)acrylic copolymer may form a matrix of the adhesive film through crosslinking with an isocyanate curing agent containing a urethane bond and an alkylene group having a carbon number of 2 or more.

In an embodiment, the (meth)acrylic copolymer may have a glass transition temperature of about −40° C. or more, for example, about −40° C. to −20° C. In an embodiment, the (meth)acrylic copolymer may have a weight average molecular weight of about 800,000 g/mol or more, for example, about 1,300,000 g/mol or more, about 1,000,000 g/mol to 1,600,000 g/mol, or about 1,000,000 g/mol to 1,300,000 g/mol. Within this range, the adhesive film can easily achieve the modulus according to embodiments of the present invention.

In an embodiment, the (meth)acrylic copolymer may have an acid value of about 0.5 mgKOH/g or less, and, in an embodiment, about 0 mgKOH/g to 0.5 mgKOH/g. Within this range, the adhesive film can suppress corrosion upon contact with a metal-containing optical element.

The (meth)acrylic copolymer may include a copolymer of a monomer mixture including a $C_1$ to $C_{20}$ alkyl group-containing (meth)acrylic monomer and a crosslinking functional group-containing (meth)acrylic monomer.

The $C_1$ to $C_{20}$ alkyl group-containing (meth)acrylic monomer is a $C_1$ to $C_{20}$ alkyl group-containing (meth)acrylic acid ester and may include at least one selected from the group of methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, 2-ethylhexyl (meth)acrylate, heptyl (meth)acrylate, octyl (meth)acrylate, iso-octyl (meth)acrylate, nonyl (meth)acrylate, decyl (meth)acrylate, and dodecyl (meth)acrylate, without being limited thereto.

The crosslinking functional group-containing (meth) acrylic monomer may include at least one selected from the group of a hydroxyl group-containing (meth)acrylic monomer and a carboxylic acid group-containing (meth)acrylic monomer. In an embodiment, the hydroxyl group-containing (meth)acrylic monomer is used as the crosslinking functional group-containing (meth)acrylic monomer to improve metal corrosion properties by reducing the acid value, as compared with the carboxylic acid group-containing (meth) acrylic monomer.

The hydroxyl group-containing (meth)acrylic monomer may include at least one selected from the group of a hydroxyl group-containing $C_1$ to $C_{20}$ alkyl group-containing (meth)acrylic monomer, a hydroxyl group-containing $C_3$ to $C_{20}$ cycloalkyl group-containing (meth)acrylic monomer, and a hydroxyl group-containing $C_6$ to $C_{20}$ aromatic group-containing (meth)acrylic monomer. For example, the hydroxyl group-containing (meth)acrylic monomer may include at least one selected from the group of 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethylene glycol mono(meth)acrylate, 2-hydroxy-3-phenyloxypropyl (meth)acrylate, 4-hydroxycyclopentyl (meth)acrylate, and 4-hydroxycyclohexyl (meth)acrylate.

The carboxylic acid group-containing (meth)acrylic monomer may be (meth)acrylic acid.

In an embodiment, the monomer mixture may include about 60 wt % to 99 wt %, for example, about 80 wt % to 99 wt %, of the $C_1$ to $C_{20}$ alkyl group-containing (meth) acrylic monomer and about 1 wt % to 40 wt %, for example, about 1 wt % to 20 wt %, of the crosslinking functional group-containing (meth)acrylic monomer. Within this range, the monomer mixture can secure the glass transition temperature of the (meth)acrylic copolymer and allows the adhesive film to exhibit adhesive properties.

The monomer mixture may further include a $C_6$ to $C_{20}$ aromatic group-containing (meth)acrylic monomer. The aromatic group-containing (meth)acrylic monomer in the adhesive film can further improve light leakage properties. The $C_6$ to $C_{20}$ aromatic group-containing (meth)acrylic monomer is a $C_6$ to $C_{20}$ aromatic group-containing (meth)acrylic acid ester and may include at least one selected from the group of phenyl (meth)acrylate and benzyl (meth)acrylate.

In an embodiment, the monomer mixture may include about 50 wt % to 80 wt %, for example, about 60 wt % to 80 wt %, of the $C_1$ to $C_{20}$ alkyl group-containing (meth)acrylic monomer, about 1 wt % to 30 wt %, for example, about 1 wt % to 20 wt %, of the crosslinking functional group-containing (meth)acrylic monomer, and about 5 wt % to 25 wt %, for example, about 10 wt % to 20 wt %, of the $C_6$ to $C_{20}$ aromatic group-containing (meth)acrylic monomer. Within this range, the monomer mixture can secure the glass transition temperature of the (meth)acrylic copolymer, allows the adhesive film to exhibit adhesive properties, and can further improve light leakage properties.

The monomer mixture may further include at least one selected from the group of a $C_3$ to $C_{20}$ alicyclic group-containing (meth)acrylic monomer and a $C_3$ to $C_{20}$ hetero-alicyclic group-containing (meth)acrylic monomer. Each of the $C_3$ to $C_{20}$ alicyclic group-containing (meth)acrylic monomer and the $C_3$ to $C_{20}$ hetero-alicyclic group-containing (meth)acrylic monomer may be selected from typical kinds known to those skilled in the art. In an embodiment, at least one selected from the group of the $C_3$ to $C_{20}$ alicyclic group-containing (meth)acrylic monomer and the $C_3$ to $C_{20}$ hetero-alicyclic group-containing (meth)acrylic monomer may be present in an amount of 20 wt % or less, for example, about 10 wt % or less, in the monomer mixture.

The (meth)acrylic copolymer may be prepared through polymerization of the monomer mixture by a typical polymerization method. The polymerization method may include a typical method known to those skilled in the art. For example, the (meth)acrylic copolymer may be prepared by adding an initiator to the monomer mixture, followed by typical copolymerization, for example, any of suspension polymerization, emulsion polymerization, solution polymerization, and the like. In an embodiment, polymerization may be performed at a polymerization temperature of about 60° C. to 70° C. for about 6 hours to 8 hours. The initiator may be selected from a typical initiator including an azo-based polymerization initiator; and/or a peroxide, such as benzoyl peroxide, acetyl peroxide, and the like.

The polyisocyanate curing agent including a plurality of units containing a urethane bond and an alkylene group having a carbon number of 2 or more can cure the (meth)acrylic copolymer to impart adhesive strength. In addition, the curing agent can secure flowability at high temperature to prevent excessive increase in storage modulus at high temperature when the (meth)acrylic oligomer is included. The "alkylene group" is a $C_6$ to $C_{20}$ linear alkylene group and may mean, for example, a hexamethylene group, dodecamethylene group or a trimethyl hexamethylene group, without being limited thereto.

In an embodiment, the curing agent may include adducts of a urethane-modified polyisocyanate curing agent including a plurality of units containing a linear alkylene group having a carbon number of 2 or more. The urethane-modified curing agent adducts can facilitate the provision of ΔG according to the present invention. The curing agent may include a polyisocyanate curing agent including a plurality of units containing a urethane bond and an alkylene group having a carbon number of 2 or more. For example, the polyisocyanate curing agent may be a urethane-containing aliphatic polyisocyanate. The aliphatic polyisocyanate curing agent is a $C_4$ to $C_{20}$ diisocyanate and may be tetramethylene diisocyanate, hexamethylene diisocyanate, dodecamethylene diisocyanate, trimethyl hexamethylene diisocyanate including 2,2,4-trimethyl hexamethylene diisocyanate, or the like. The urethane-modified polyisocyanate curing agent may be obtained from commercially available products.

In an embodiment, the curing agent may include a polyisocyanate curing agent having a unit represented by Formula 1. In an embodiment, the curing agent includes a plurality of units represented by Formula 1:

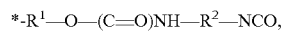

where * is a linking site, and $R^1$ and $R^2$ are identical to or different from each other and are a bivalent $C_2$ to $C_{20}$ aliphatic hydrocarbon group.

In an embodiment, the curing agent may be present in an amount of about 5 parts by weight or less, for example, about 0.5 parts by weight to 5 parts by weight, and, in an embodiment, about 0.5 parts by weight to 2 parts by weight, relative to about 100 parts by weight of the (meth)acrylic copolymer. Within this range, the adhesive film can secure adhesive properties while reducing storage modulus at high temperature.

In another embodiment, the curing agent may include at least one selected from the group of an isocyanate-based curing agent, an imide-based curing agent, an epoxy-based curing agent, and an aziridine-based curing agent.

The isocyanate-based curing agent may include at least one selected from the group of xylene diisocyanate (XDI) including m-xylene diisocyanate and the like, methylene bis(phenyl isocyanate) (MDI) including 4,4'-methylene bis(phenyl isocyanate) and the like, naphthalene diisocyanate, toluene diisocyanate, hexamethylene diisocyanate, and isophorone diisocyanate, and a polyol-modified adduct thereof.

In an embodiment, the curing agent may be present in an amount of greater than 0 to 5 parts by weight or less, for example, about 0.1 parts by weight to 5 parts by weight, relative to about 100 parts by weight of the (meth)acrylic copolymer. Within this range, the adhesive film can secure adhesive properties while reducing storage modulus at high temperature.

In an embodiment, the curing agent may be a non-isocyanurate curing agent free from an isocyanurate group. The presence of an isocyanurate group-containing curing agent in the (meth)acrylic copolymer and the (meth)acrylic oligomer can cause a problem of an insignificant effect in suppression of warpage at high temperature.

The (meth)acrylic oligomer can improve compression failure at room temperature by increasing storage modulus of the adhesive film at room temperature. Although an excess of the curing agent may be included in the (meth)acrylic copolymer to improve storage modulus at room temperature, addition of an excess of the curing agent can cause deterioration in inherent properties of the adhesive film, such as peel strength and the like. The (meth)acrylic oligomer can improve density of the adhesive film while preventing or substantially preventing decrease in peel strength.

In an embodiment, the (meth)acrylic oligomer has a higher glass transition temperature than the (meth)acrylic copolymer to improve storage modulus of the adhesive film at room temperature.

In an embodiment, the (meth)acrylic oligomer has a glass transition temperature of about 20° C. to 60° C. (for example, 20° C., 30° C., 40° C., 50° C., or 60° C.), for example, about 30° C. to 50° C., for example, about 30° C. to 40° C. Within this range, the (meth)acrylic oligomer can increase storage modulus of the adhesive film at room temperature while preventing or substantially preventing excessive increase in storage modulus of the adhesive film at high temperature.

In an embodiment, the (meth)acrylic oligomer has a smaller weight average molecular weight than the (meth)acrylic copolymer. For example, the (meth)acrylic oligomer may have a weight average molecular weight of about 1,000 to 30,000 g/mol (for example, 1,000, 2,000, 3,000, 4,000, 5,000, 6,000, 7,000, 8,000, 9,000, 10,000, 11,000, 12,000, 13,000, 14,000, 15,000, 16,000, 17,000, 18,000, 19,000, 20,000, 21,000, 22,000, 23,000, 24,000, 25,000, 26,000, 27,000, 28,000, 29,000, or 30,000 g/mol), for example, about 2,000 g/mol to 20,000 g/mol. Within this range, the (meth)acrylic oligomer can increase storage modulus of the adhesive film at room temperature while decreasing the storage modulus of the adhesive film at high temperature.

In an embodiment, the (meth)acrylic oligomer may essentially consist of a (meth)acrylic monomer having a glass transition temperature of about 90° C. or more, for example, about 100° C. to 120° C., in a homopolymer phase. Within this range, the (meth)acrylic oligomer can prevent or substantially prevent excessive increase in storage modulus of the adhesive film at high temperature while securing the glass transition temperature within the above range. For example, the (meth)acrylic monomer may be a mono-functional (meth)acrylic monomer, and, in an embodiment, t-butyl methacrylate, methyl acrylate, and hydroxyethyl methacrylate, without being limited thereto.

In an embodiment, the (meth)acrylic oligomer may further include a (meth)acrylic monomer having a glass transition temperature of about 50° C. or less, for example, about −30° C. to 0° C., in a homopolymer phase. Herein, "essentially consist of" means that the corresponding monomer is present in an amount of about 50 wt % or more, for example, about 60 wt % or more, based on the total amount of the (meth)acrylic oligomer.

In an embodiment, the (meth)acrylic oligomer may be present in an amount of about 1 part by weight to 30 parts by weight, for example, about 2.5 parts by weight to 20 parts by weight, and, in an embodiment, about 2.5 parts by weight to 10 parts by weight, relative to about 100 parts by weight of the (meth)acrylic copolymer. Within this range, the (meth)acrylic oligomer can increase storage modulus of the adhesive film at room temperature while preventing or substantially preventing excessive increase in storage modulus of the adhesive film at high temperature The antistatic agent may be selected from any kind of antistatic agent so long as the antistatic agent can impart antistatic properties by providing surface resistance to the adhesive film. The antistatic agent may include a cationic antistatic agent, an anionic antistatic agent, an amphoteric antistatic agent, a non-ionic antistatic agent, or an ion conductive polymer obtained through polymerization or copolymerization of a monomer having an ion conductive group of the cationic antistatic agent, the anionic antistatic agent, or the amphoteric antistatic agent.

The antistatic agent may include a surfactant, an ionic liquid, an alkali metal salt, a metal oxide, fine metal particles, a conductive polymer, carbon, carbon nanotubes, and the like. In an embodiment, the antistatic agent includes a surfactant, an ionic liquid, and an alkali metal salt in terms of transparency or affinity with respect to the (meth)acrylic copolymer.

Examples of the surfactant may include a non-ionic surfactant, a cationic surfactant, an anionic surfactant, and an amphoteric surfactant. Examples of the non-ionic surfactant may include polyoxyethylene alkyl ethers, polyoxyethylene alkyl phenyl ethers, sorbitan esters of fatty acids, sorbitan esters of polyoxyethylene fatty acids, esters of polyoxyethylene fatty acids, esters of glycerin fatty acids, esters of propylene glycol fatty acids, and polyoxyalkylene-modified silicones. Examples of the cationic surfactant may include alkyl trimethyl ammonium salts, dialkyl dimethyl ammonium salts, alkyl benzyl dimethyl ammonium salts, and the like. Examples of the anionic surfactant may include monoalkyl sulfates, alkyl polyoxyethylene sodium sulfates, alkyl benzene sulfonates, monoalkyl phosphates, and the like. Examples of the amphoteric surfactant may include alkyl dimethylamine oxide, alkyl carboxybetaine, and the like.

An ionic compound consists of an anion and a cation. An ionic liquid has a liquid phase at room temperature, and an ionic solid has a solid phase at room temperature.

In the ionic compound, a cationic part may include an organic cation or an inorganic cation, for example, cyclic amidine ions, such as imidazolium ions and the like, pyridinium ions, ammonium ions, sulfonium ions, phosphonium ions, organic cations, such as ammonium, pyridinium, imidazolium, phosphonium, and sulfonium, or alkali metal cations. The ammonium may include, for example, a quaternary ammonium salt having four alkyl substituent groups, such as tetra-butyl ammonium; the pyridinium may include, for example, pyridinium obtained through substitution of N of pyridine with an alkyl group, such as 1-ethyl pyridinium, 1-butyl pyridinium, 1-hexyl pyridinium, 1-butyl-3-methyl pyridinium, 1-butyl-4-methyl pyridinium, 1-hexyl-3-methyl pyridinium, 1-butyl-3,4-dimethyl pyridinium, and 1-octyl-4-methyl pyridinium; and the imidazolium may include, for example, imidazolium obtained through substitution of the 1,3-position of imidazole with an alkyl group, such as 1-methyl-3-butyl imidazolium and 1-methyl-3-hexyl imidazolium; the phosphonium may include, for example, a quaternary phosphonium salt having four alkyl substituent groups, such as tetrabutyl phosphonium; and the sulfonium may include, for example, a ternary sulfonium salt having three alkyl substituent groups, such as tributyl sulfonium. In addition, the alkali metal cations may include, for example, lithium salt, sodium salt, or potassium salt.

In the ionic compound, an anionic part may include an organic anion or an inorganic anion, for example, $C_nH_{2n+1}COO^-$, $C_nF_{2n+1}COO^-$, $NO_3^-$, $C_nF_{2n+1}SO_3^-$, $(C_nF_{2n+1}SO_2)_2N^-$, $(C_nF_{2n+1}SO_2)_3C^-$, $PO_4^{3-}$, $AlCl_4^-$, $Al_2Cl_7^-$, $ClO_4^-$, $BF_4^-$, $PF_6^-$, $AsF_6^-$, $SbF_6^-$, and the like. In these chemical formulas, n is an integer of 0 or more. In an embodiment, the anion may include OTf (trifluoromethane sulfonate), OTs (toluene-4-sulfonate), Oms (methane sulfonate), $Cl^-$, $Br^-$, $I^-$, $AlCl_4^-$, $Al_2Cl_7^-$, $BF_4^-$, $PF_6^-$, $ClO_4^-$, $NO_3^-$, $CH_3COO^-$, $CF_3COO^-$, $CH_3SO_3^-$, $CF_3SO_3^-$, $(CF_3SO_2)_2N^-$, $(CF_3SO_2)_3C^-$, $AsF_6^-$, $SbF_6^-$, $NbF_6^-$, $TaF_6^-$, $F(HF)n^-$, $(CN)_2N^-$, $C_4F_9SO_3^-$, $(C_2F_5SO_2)_2N^-$, $C_3F_7COO^-$, $(CF_3SO_2)(CF_3CO)N^-$, and the like.

Among these compounds, a sulfonyl imide-based compound may be used in terms of durability and antistatic properties. By way of example, a compound represented by Formula 2 may be used. In Formula 2, a sulfonyl imide-based anion may be used in that, since fluorine atoms contained in the anion have high electronegativity to provide a large stabilization effect of an anion present in a nitrogen atom, hydrophobicity of the antistatic agent can be improved, thereby securing excellent compatibility with an acrylic copolymer, no surface migration, durability reliability, and antistatic properties.

  Formula 2:

where M is an alkali metal, and R is a fluorine atom or a $C_1$ to $C_4$ perfluoro alkyl group.

The alkali metal may be lithium, sodium, potassium, or cesium, and, in an embodiment, lithium, sodium, or potassium.

The antistatic compound represented by Formula 2 may include, for example, bis(fluorosulfonyl)imide potassium ($KN(FSO_2)_2$), bis(fluorosulfonyl)imide sodium ($NaN(FSO_2)_2$), bis(fluorosulfonyl)imide lithium ($LiN(FSO_2)_2$), bis(trifluorosulfonyl)imide potassium ($KN(CF_3SO_2)_2$), bis(trifluorosulfonyl)imide sodium ($NaN(CF_3SO_2)_2$), and bis(trifluorosulfonyl)imide lithium ($LiN(CF_3SO_2)_2$), and, in an embodiment, bis(fluorosulfonyl)imide potassium ($KN(FSO_2)_2$) or bis(fluorosulfonyl)imide sodium ($NaN(FSO_2)_2$). These compounds may be used alone or as a mixture thereof.

In other embodiments, the antistatic agent may include: amphoteric antistatic agents, such as alkyl betaine and derivatives thereof, imidazoline and derivatives thereof, alanine and derivatives thereof, and the like; non-ionic antistatic agents, such as amino alcohol and derivatives thereof, glycerin and derivatives thereof, polyethylene glycol and derivatives thereof, and the like; an ion conductive polymer obtained through polymerization or copolymerization of a monomer having an ion conductive group (for example, a quaternary ammonium salt group) of the cationic antistatic agent, the anionic antistatic agent, or the amphoteric antistatic agent; a conductive polymer, such as polythiophene, polyaniline, polypyrrole, polyethylenimine, and an allylamine-based polymer.

In other embodiments, the antistatic agent is an inorganic antistatic agent, such as tin oxide, antimony oxide, indium oxide, cadmium oxide, titanium oxide, zinc oxide, indium, tin, antimony, gold, silver, copper, aluminum, nickel, chromium, titanium, iron, cobalt, copper iodide, and ITO (indium oxide/tin oxide), ATO (antimony oxide/tin oxide), and the like. These inorganic antistatic agents may be used alone or as a mixture thereof.

In an embodiment, relative to 100 parts by weight of the (meth)acrylic copolymer, the antistatic agent may be present in an amount of 0.1 parts by weight to 10 parts by weight, for example, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, or 10 parts by weight, and, in an embodiment, 0.5 parts by weight to 10 parts by weight. Within this range, the antistatic agent does not bleed out of the adhesive film and can secure an antistatic effect.

In an embodiment, the adhesive film may further include a silane coupling agent. The silane coupling agent can increase adhesive strength of the adhesive film. The silane coupling agent may include typical silane coupling agents known to those skilled in the art. For example, the silane coupling agent may include epoxy group-containing silane coupling agents, such as glycidoxypropyltrimethoxysilane and glycidoxypropylmethyldimethoxysilane, without being limited thereto.

In an embodiment, the silane coupling agent may be present in an amount of about 0.01 parts by weight to 5 parts by weight relative to about 100 parts by weight of the (meth)acrylic copolymer. Within this range, the adhesive film can have improved adhesive strength.

The adhesive film may further include a crosslinking catalyst. The crosslinking catalyst can increase the degree of crosslinking of an adhesive layer formed of the adhesive composition. The crosslinking catalyst may include at least one selected from the group of metals and metal-containing compounds. In an embodiment, the crosslinking catalyst may include at least one selected from the group of a tin-containing compound, a zinc-containing compound, a titanium compound, and a bismuth compound. In an embodiment, the crosslinking catalyst may include at least one selected from the group of dibutyltin dilaurate and dimaleate tin. In an embodiment, the crosslinking catalyst may be present in an amount of about 0.01 parts by weight to 1.5 parts by weight relative to about 100 parts by weight of the (meth)acrylic copolymer. Within this range, the adhesive composition can have an increased degree of crosslinking and can suppress moisture permeation.

The adhesive film may further include additives. The additives can provide additional functions to the adhesive film. In an embodiment, the additives may include at least one selected from the group of UV absorbents, reaction inhibitors, adhesion improvers, thixotropic agents, conductivity imparting agents, color modifiers, stabilizers, antioxidants, and leveling agents, without being limited thereto.

The adhesive film may be prepared by a typical method using an adhesive composition including the (meth) acrylic copolymer, the curing agent, the (meth) acrylic oligomer, and the antistatic agent.

Next, a polarizing plate according to an embodiment will be described.

The polarizing plate may include a polarizer and an adhesive film stacked on a surface of the polarizer, in which the adhesive film is the adhesive film for polarizing plates according to an embodiment of the present invention. The adhesive film serves to attach the polarizing plate to an optical element, such as a liquid crystal display. In an embodiment, the polarizing plate may further include a protective layer formed on one or both surfaces of the polarizer.

The polarizer may include a polarizer manufactured using a polyvinyl alcohol resin film. In an embodiment, the polarizer may include a polyvinyl alcohol-based polarizer manufactured by dyeing the polyvinyl alcohol resin film with at least one selected from the group of iodine and a dichroic dye, or may be a polyene-based polarizer manufactured by dehydrating the polyvinyl alcohol resin film.

In an embodiment, the polarizer may have a thickness of about 5 μm to 30 μm, and, in an embodiment, about 5 μm to 20 μm. Within this range, the polarizer can be used in the polarizing plate and can realize thickness reduction of the polarizing plate.

The protective layer may be formed on one or both surfaces of the polarizer to protect the polarizer. The protective layer may be a protective film layer, which is a film type layer, or a protective coating layer, which is a coating type layer.

In one embodiment, the protective layer may include a protective film formed of an optically transparent resin. In an embodiment, the resin may include at least one selected from the group of cyclic polyolefin resins including amorphous cyclic olefin polymer (COP), poly(meth)acrylate resins, polycarbonate resins, polyester resins including polyethylene terephthalate (PET), cellulose ester resins including triacetylcellulose (TAC), polyether sulfone resins, polysulfone resins, polyamide resins, polyimide resins, non-cyclic polyolefin resins, polyarylate resins, polyvinyl alcohol resins, polyvinyl chloride resins, and polyvinylidene resins. In some embodiments, the protective film may be formed of one kind of polyester resin and may be a monolayer film. In an embodiment, the protective film may have a thickness of about 5 μm to about 200 μm, and, in an embodiment, about 10 μm to about 150 μm, and, in an embodiment, about 20 μm to about 100 μm. Within this range, the protective film can be used in the polarizing plate.

In another embodiment, the protective coating layer may be formed of an actinic radiation-curable resin composition including an actinic radiation-curable compound and a polymerization initiator. In an embodiment, the protective coating layer may have a thickness of about 5 μm to about 200 μm, and, in an embodiment, about 5 μm to about 20 μm, and, in an embodiment, about 4 μm to about 10 μm. Within this range, the protective coating layer can be used in the polarizing plate. In an embodiment, the protective coating layer may be directly formed on the polarizer. Herein, "directly formed" means that any adhesive layer and/or any bonding layer is not interposed between the polarizer and the protective coating layer.

In an embodiment, the protective layer may be bonded to the polarizer via a bonding agent for polarizing plates. The bonding agent for polarizing plates may be selected from the group of typical bonding agents for polarizing plates known to those skilled in the art. The polarizing plate may further include a coating layer on a surface of the protective layer, that is, on a surface of the protective layer opposite to the polarizer. The polarizing plate may further include a release film formed on the other surface of the adhesive film, that is, on a surface of the adhesive film opposite to the polarizer or the protective layer to protect the adhesive film from foreign matter.

Next, an optical display apparatus according to an embodiment will be described.

The optical display apparatus may include the adhesive film for polarizing plates or the polarizing plate according to an embodiment of the present invention. The optical display apparatus may include any of a liquid crystal display, an organic light emitting display, and a flexible organic light emitting display, without being limited thereto. In an embodiment, the optical display apparatus may include a visibility enhancing film including quantum dots to improve color reproducibility and visibility. For example, the optical display apparatus may include a liquid crystal display including in-plane switching (IPS) liquid crystals.

Referring to the drawing, in an embodiment, a liquid crystal display includes an in-cell type liquid crystal panel 100, a first polarizing plate 200 disposed on a light exit surface of the in-cell type liquid crystal panel 100, and a second polarizing plate 300 disposed on a light incident surface of the in-cell type liquid crystal panel 100, wherein the first polarizing plate 200 includes the polarizing plate according to an embodiment of the present invention.

In an embodiment, the in-cell type liquid crystal panel 100 includes a first substrate 110, a second substrate 120 disposed to face the first substrate 110, a liquid crystal layer 130 interposed between the first substrate 110 and the second substrate 120, a touch sensor layer 140 interposed between the first substrate 110 and the liquid crystal layer 130, and drive electrodes and a sensor layer 150 interposed between the liquid crystal layer 130 and the second substrate 120.

The second polarizing plate 300 may include a typical polarizing plate well-known to those skilled in the art.

Next, the present invention will be described in further detail with reference to some examples. However, it is noted that these examples are provided for purposes of illustration and are not to be construed in any way as limiting the present invention.

Details of components used in Examples and Comparative Examples are as follows.

(A) (Meth)acrylic copolymer: Acrylic copolymer (weight average molecular weight: 1000,000, Acid value: 0.5 mg KOH/g, Glass transition temperature: −30° C.) comprising 80 wt % of butyl acrylate, 5 wt % of 2-hydroxyethylacrylate, and 15 wt % of benzyl methacrylate.

(B) Curing agent: AE700-100 (polyisocyanate adduct containing a plurality of units represented by *-$C_{15}H_{30}$—O—(C=O)NH—$C_6H_{12}$—NCO [* being a linking site], solid content: 100 wt %, ASAHIKASEI CHEMICAL Co., Ltd.)

(C) (Meth)acrylic oligomer: SW0077 ((meth)acrylic oligomer mainly consisting of t-butyl methacrylate, Tg: 35° C., NCI Co., Ltd.)

(D) Antistatic agent (D1): FC 4400L (3M)

(D2): ILP-14 (KOEI Co., Ltd.)

(E) Silane coupling agent: KBM 403 (methoxyepoxysilane, Shin-Etsu Chemical Co., Ltd.)

Example 1

A composition for adhesive films was prepared by mixing 100 parts by weight of the (meth)acrylic copolymer (A), 0.4 parts by weight of the curing agent (B), 6.25 parts by weight of the (meth)acrylic oligomer (C), 10 parts by weight of the antistatic agent (D), and 0.06 parts by weight of the silane coupling agent (E) in terms of solid content. Then, the prepared composition was coated to a thickness of 23 μm on a PET (polyethylene terephthalate) release film, dried at 110° C. for 4 minutes, and left at 35° C. and 45% RH for 1 day, thereby preparing an adhesive sheet including a 23 μm thick adhesive film.

Examples 2 to 8

Each adhesive sheet was prepared in the same manner as in Example 1 except that components for a composition for adhesive films and the content thereof were changed as listed in Table 1.

Comparative Example 1 and 2

Each adhesive sheet was prepared in the same manner as in Example 1 except that components for a composition for adhesive films and the content thereof were changed as listed in Table 2.

Tables 1 and 2 show the compositions for the adhesive films prepared in the Examples and Comparative Examples. Properties of Tables 1 and 2 were evaluated on the adhesive films prepared in the Examples and Comparative Examples.

(1) Modulus: Storage modulus was measured on a 0.8 mm thick specimen at about 25° C. or at about 85° C. using an ARES (Advanced Rheometric Expansion System, TA Instruments Inc.) by temperature sweep testing (strain 5%, normal force 100 N) at 1 Hz while increasing the temperature from about 0° C. to 120° C. at a heating rate of about 10° C./min, which the 0.8 mm thick specimen was prepared by stacking a plurality of 23 μm thick adhesive films prepared in the Examples and Comparative Examples one above another. Storage modulus at 25° C. was defined as G1 and storage modulus at 85° C. was defined as G2. ΔG was calculated according to Equation 2.

(2) Surface resistance: An adhesive sheet including an adhesive film (thickness: 23 μm) for polarizing plates prepared by substantially the same method as in the Examples and Comparative Examples was attached to an upper surface of a PET release film, which in turn was bonded to a lower surface of the adhesive film for polarizing plates using a roller and cut into a square-shaped specimen having a size of 50 mm×50 mm. Surface resistance was measured on a surface of the adhesive film for polarizing plates exposed by removing the PET release film using a surface resistance tester (HT-450, Mitsubishi Chemical Co., Ltd.) at about 10 V for about 10 seconds, followed by recording a surface resistance value. A log value of the measured surface resistance was defined as SR1. Then, the adhesive film for polarizing plates was left under conditions of 85° C. and 85% RH for 250 hours. A surface resistance value of the adhesive film was recorded by the same method. A log value of the measured surface resistance was defined as SR2. ΔSR was calculated according to Equation 1.

(3) ESD: A polarizing plate (polarizing plate including a first triacetylcellulose film stacked on one surface of a polarizer and a second triacetylcellulose film stacked on the other surface of the polarizer) was stacked on a liquid crystal panel via the adhesive film for polarizing plates. A voltage of 10 kV was applied to the surface of the first triacetylcellulose film using an electrostatic discharge gun to measure a time for which a portion brightened by static electricity was discolored again. A shorter measurement time indicates a better polarizing plate having reliability with respect to electric shock.

⊚: 3 seconds or less
○: Longer than 3 seconds to 5 seconds or less
Δ: Longer than 5 seconds to 20 seconds or less
X: Longer than 20 seconds (4) Peel strength: 180° peel strength of each of the adhesive films of the Examples and Comparative Examples with respect to a glass plate was measured in accordance with JIS2107. The adhesive film was cut into a size of 25 mm×100 mm and laminated on a glass plate to prepare a specimen. The adhesive film and the glass plate of the specimen were connected to upper and lower jigs of a tensile tester (Texture Analyzer), followed by measuring peel strength upon peeling at 25° C. under conditions of a peeling speed of 300 mm/min and a peeling angle of 180°. Then, the adhesive film was left under conditions of 85° C. and 85% RH for 250 hours, followed by measuring peel strength upon peeling at 25° C. in the same manner at a peeling speed of 300 mm/min and at a peeling angle of 180°.

(5) Reliability of heat resistance and humidity resistance: A polarizing plate including the adhesive film for polarizing plates attached thereto was prepared in the same manner as in (3). The polarizing plate was attached to a glass plate via the adhesive film and cut into specimen having a size of 100 mm×100 mm. The specimen was left under conditions of 85° C. and 85% RH for 500 hours. The specimen was left at room temperature for 1 hour or more and evaluated with the naked eye or a microscope according to the following criteria. A polarizing plate suffering from no generation of bubbles or cracks was evaluated as "good" and a polarizing plate suffering from generation of bubbles or cracks was evaluated as "poor."

TABLE 1

| | | Example | | | | | | | |
|---|---|---|---|---|---|---|---|---|---|
| | | 1 | 2 | 3 | 4 | 5 | 6 | 7 | 8 |
| (A) | | 100 | 100 | 100 | 100 | 100 | 100 | 100 | 100 |
| (B) | | 0.4 | 0.6 | 0.8 | 0.6 | 0.6 | 0.6 | 0.6 | 0.4 |
| (C) | | 6.25 | 6.25 | 6.25 | 2.5 | 5 | 7.5 | 10 | 6.25 |
| (D) | (D1) | 10 | 10 | 10 | 10 | 10 | 10 | 0 | 0 |
| | (D2) | 0 | 0 | 0 | 0 | 0 | 0 | 10 | 10 |
| (E) | | 0.06 | 0.06 | 0.06 | 0.06 | 0.06 | 0.06 | 0.06 | 0.06 |
| Modulus (MPa) | G1 (@25° C.) | 0.58 | 0.6 | 0.6 | 0.5 | 0.55 | 0.71 | 0.58 | 0.71 |
| | G2 (@85° C.) | 0.048 | 0.048 | 0.048 | 0.048 | 0.045 | 0.042 | 0.042 | 0.042 |
| | ΔG | 0.532 | 0.552 | 0.552 | 0.452 | 0.505 | 0.668 | 0.538 | 0.668 |
| Surface resistance (logΩ/□) | SR1 | 9.2 | 9.16 | 9.11 | 9.10 | 9.21 | 9.45 | 9.2 | 9.45 |
| | SR2 | 9.5 | 9.46 | 9.44 | 9.52 | 9.52 | 9.82 | 9.5 | 9.82 |
| | ΔSR | 0.3 | 0.3 | 0.33 | 0.42 | 0.31 | 0.37 | 0.3 | 0.37 |
| ESD | | ⊚ | ⊚ | ⊚ | ⊚ | ⊚ | ⊚ | ⊚ | ⊚ |
| Peel strength (gf/25 mm, @25° C.) | | 185 | 166 | 134 | 100 | 130 | 144 | 148 | 170 |
| Peel strength (gf/25 mm, @85° C., 85%) | | 750 | 756 | 780 | 650 | 655 | 720 | 720 | 745 |
| Reliability | | Good | Good | Good | Good | Good | Good | Good | Good |

TABLE 2

| | | Comparative Example | |
|---|---|---|---|
| | | 1 | 2 |
| (A) | | 100 | 100 |
| (B) | | 0.6 | 1.5 |
| (C) | | 0 | 0 |
| (D) | (D1) | 10 | 10 |
| | (D2) | 0 | 0 |
| (E) | | 0.06 | 0.06 |
| Modulus (MPa) | G1 (@25° C.) | 0.2 | 0.2 |
| | G2 (@85° C.) | 0.15 | 0.15 |
| | ΔG | 0.05 | 0.05 |
| Surface resistance (logΩ/□) | SR1 | 9.2 | 9.2 |
| | SR2 | 9.9 | 9.9 |
| | ΔSR | 0.7 | 0.7 |
| ESD | | Δ | Δ |
| Peel strength (gf/25 mm, @25° C.) | | 80 | 20 |
| Peel strength (gf/25 mm, @85° C., 85%) | | 450 | 150 |
| Reliability | | Poor | Poor |

As shown in Tables 1 and 2, the adhesive films for polarizing plates according to the present invention have good reliability of surface resistance under high temperature and high humidity conditions and secure target surface resistance and good peel strength. In addition, the adhesive films for polarizing plates according to the present invention could realize a touch sensing function even when left under high temperature and high humidity conditions for a long period of time, suppress display failure and malfunction, and minimize or reduce a time for which a whitening phenomenon of liquid crystals disappears upon electric shock.

It is to be understood that, while some example embodiments have been described herein, various modifications, changes, alterations, and equivalent embodiments can be made by those skilled in the art without departing from the spirit and scope of the present invention.

What is claimed is:

1. An adhesive film for polarizing plates, comprising a (meth)acrylic copolymer, a curing agent, a (meth)acrylic oligomer, and an antistatic agent, the adhesive film having:
    a storage modulus of about 0.5 MPa to 1.0 MPa at about 25° C., as measured on a 0.8 mm thick specimen of the adhesive film, by temperature sweep testing (strain: 5%, normal force: 100 N) at 1 Hz while increasing the temperature from about 0° C. to 120 ° C. at a heating rate of about 10° C/min;
    an initial peel strength of about 100 gf/25 mm to 300 gf/25 mm, and a peel strength of about 500 gf/25 mm to 800 gf/25 mm when left under conditions of about 85° C. and about 85% relative humidity for about 250 hours, wherein the term "peel strength" refers to 180° peel strength between the adhesive film for polarizing plates and a glass plate, as measured at 25° C. in accordance with JIS 2107;
    each of an initial surface resistance and a surface resistance of the adhesive film left under conditions of about 85° C. and about 85% relative humidity for about 250 hours, of from $1 \times 10^8 \Omega/\square$ to $1 \times 10^{11} \Omega/\square$; and
    a surface resistance difference $\Delta SR$ of about 1.0 log ($\Omega/\square$) or less, as calculated by the following Equation 1:

$$\Delta SR = SR2 - SR1,$$

where SR1 is a log base 10 value (unit: log ($\Omega/\square$)) of the initial surface resistance of the adhesive film, and SR2 is a log base 10 value (unit: log($\Omega/\square$)) of the surface resistance of the adhesive film left under conditions of about 85° C. and about 85% relative humidity for about 250 hours,
    wherein relative to 100 parts by weight of the (meth)acrylic copolymer, the antistatic agent is 6 parts by weight to 10 parts by weight in amount.

2. The adhesive film for polarizing plates according to claim 1, wherein the adhesive film has a modulus of about 0.05 MPa or less at about 85° C.

3. The adhesive film for polarizing plates according to claim 1, wherein the adhesive film has a modulus difference ($\Delta G$) of about 0.06 MPa or more, as calculated by the following Equation 2:

$$\Delta G = G1 - G2,$$

where G1 is the modulus at about 25° C. (unit: MPa) of the adhesive film, and G2 is a modulus at about 85° C. (unit: MPa) of the adhesive film.

4. The adhesive film for polarizing plates according to claim 1, wherein the antistatic agent comprises a cationic antistatic agent, an anionic antistatic agent, an amphoteric antistatic agent, a non-ionic antistatic agent, or an ion conductive polymer obtained through polymerization or copolymerization of a monomer having an ion conductive group of the cationic antistatic agent, the anionic antistatic agent, or the amphoteric antistatic agent.

5. The adhesive film for polarizing plates according to claim 1, wherein the antistatic agent comprises at least one selected from the group consisting of a surfactant, an ionic liquid, an alkali metal salt, a metal oxide, fine metal particles, a conductive polymer, carbon, and carbon nanotubes.

6. The adhesive film for polarizing plates according to claim 1, wherein the antistatic agent comprises an ionic liquid.

7. The adhesive film for polarizing plates according to claim 1, wherein the (meth)acrylic oligomer has a glass transition temperature of about 20° C. to about 60° C.

8. The adhesive film for polarizing plates according to claim 1, wherein the (meth)acrylic oligomer has a weight average molecular weight of about 1,000 g/mol to 30,000 g/mol.

9. The adhesive film for polarizing plates according to claim 1, wherein the (meth)acrylic oligomer comprises at least one oligomer selected from the group consisting of t-butyl methacrylate, methyl acrylate, and hydroxyethyl methacrylate.

10. The adhesive film for polarizing plates according to claim 1, wherein the curing agent comprises a polyisocyanate curing agent comprising a plurality of units containing a urethane bond and an alkylene group having a carbon number of 2 or more.

11. The adhesive film for polarizing plates according to claim 10, wherein the curing agent comprises a plurality of units represented by the following Formula 1:

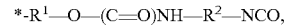

*-R$^1$—O—(C=O)NH—R$^2$—NCO, where * is a linking site, and R$^1$ and R$^2$ are identical to or different from each other and are a bivalent $C_2$ to $C_{20}$ aliphatic hydrocarbon group.

12. The adhesive film for polarizing plates according to claim 1, wherein the (meth)acrylic copolymer comprises a copolymer of a monomer mixture comprising a $C_1$ to $C_{20}$ alkyl group-containing (meth)acrylic monomer and a hydroxyl group-containing (meth)acrylic monomer.

13. The adhesive film for polarizing plates according to claim 12, wherein the monomer mixture further comprises an aromatic group-containing (meth)acrylic monomer.

14. The adhesive film for polarizing plates according to claim 1, comprising:
    about 100 parts by weight of the (meth)acrylic copolymer;
    greater than 0 to 5 parts by weight or less of the curing agent;
    about 1 part by weight to 30 parts by weight of the (meth)acrylic oligomer; and
    6 parts by weight to 10 parts by weight of the antistatic agent.

15. A polarizing plate comprising:
    a polarizer; and
    the adhesive film for polarizing plates according to claim 1 stacked on a surface of the polarizer.

16. An optical display apparatus comprising the polarizing plate according to claim 15.

* * * * *